US009286809B2

(12) United States Patent
Yang et al.

(10) Patent No.: US 9,286,809 B2
(45) Date of Patent: Mar. 15, 2016

(54) CARDIOPULMONARY RESUSCITATION (CPR) SIMULATOR ENABLING REPEATED DEFIBRILLATION TRAINING

(71) Applicant: BT Inc., Goyang-si (KR)

(72) Inventors: Seung-Jin Yang, Goyang-si (KR); Dae-Yong Kim, Goyang-si (KR); In-Bae Chang, Seoul (KR)

(73) Assignee: BT Inc., Goyang-si (KR)

( * ) Notice: Subject to any disclaimer, the term of this patent is extended or adjusted under 35 U.S.C. 154(b) by 125 days.

(21) Appl. No.: 13/967,661

(22) Filed: Aug. 15, 2013

(65) Prior Publication Data

US 2014/0099618 A1    Apr. 10, 2014

(30) Foreign Application Priority Data

Oct. 10, 2012   (KR) .................. 10-2012-0112642

(51) Int. Cl.
*G09B 23/22*     (2006.01)
*G09B 23/28*     (2006.01)

(52) U.S. Cl.
CPC .................................. *G09B 23/288* (2013.01)

(58) Field of Classification Search
CPC ... G09B 23/288; G09B 23/285; A63B 69/004
USPC ....................................................... 434/265
See application file for complete search history.

(56) References Cited

U.S. PATENT DOCUMENTS

| | | | | |
|---|---|---|---|---|
| 4,611,998 A * | 9/1986 | Ramamurthy | ................ | 434/265 |
| 4,758,819 A * | 7/1988 | Kuribayashi | ............ | 340/286.08 |
| 5,137,458 A * | 8/1992 | Ungs et al. | ..................... | 434/262 |
| 5,275,572 A * | 1/1994 | Ungs et al. | ..................... | 434/265 |
| 5,993,219 A * | 11/1999 | Bishay | ......................... | 434/265 |
| 6,336,047 B1 * | 1/2002 | Thu et al. | .......................... | 607/5 |
| 6,638,073 B1 * | 10/2003 | Kazimirov et al. | ........... | 434/272 |
| 6,872,080 B2 * | 3/2005 | Pastrick et al. | ............... | 434/262 |
| 6,969,259 B2 | 11/2005 | Pastrick et al. | | |
| RE40,471 E * | 8/2008 | Groenke et al. | .................. | 607/6 |
| 2001/0047140 A1 * | 11/2001 | Freeman | ......................... | 601/41 |
| 2003/0036044 A1 * | 2/2003 | Pastrick et al. | ............... | 434/265 |
| 2003/0199929 A1 * | 10/2003 | Snyder et al. | ..................... | 607/7 |
| 2010/0022904 A1 * | 1/2010 | Centen | .......................... | 600/534 |

FOREIGN PATENT DOCUMENTS

| | | | |
|---|---|---|---|
| CN | | 2349135 Y | * 11/1998 |
| KR | 10-2013-0015751 A | | 2/2013 |
| WO | WO 2012141586 A1 | | * 10/2012 |

* cited by examiner

*Primary Examiner* — Sam Yao
*Assistant Examiner* — Michael Humphrey
(74) *Attorney, Agent, or Firm* — NSIP Law

(57) ABSTRACT

There is provided a Cardiopulmonary Resuscitation (CPR) simulator enabling repeated defibrillation training to allow a user to practice CPR and use of a defibrillator, and the CPR simulator includes a dummy in a body shape similar to a human body shape; a first magnet installed on a upper right part of a chest of a body of the dummy; a second magnet installed on a bottom left side of the chest of the body of the dummy; a first training pad having a first metal sheet formed on one side thereof and a first electrode pad formed on the other side thereof; and a second training pad having a second metal sheet formed on one side thereof and a second electrode pad formed on the other side thereof.

5 Claims, 7 Drawing Sheets

CARDIOPULMONARY RESUSCITATION (CPR) SIMULATOR ENABLING REPEATED DEFIBRILLATION TRAINING

CROSS-REFERENCE TO RELATED APPLICATION

This application claims the benefit under 35 U.S.C. §119(a) of Korean Patent Application No. 10-2012-0112642, filed on Oct. 10, 2012, in the Korean Intellectual Property Office, the entire disclosure of which is incorporated herein by reference for all purposes.

BACKGROUND

1. Field

The following description relates to a Cardiopulmonary Resuscitation (CPR) simulator enabling repeated defibrillation training, and more particularly, to a CPR simulator employing magnetic electrode pads, which enables repeated defibrillation training to be performed in conjunction with CPR.

2. Description of the Related Art

Cardiopulmonary Resuscitation (CPR) is an emergency procedure, performed in an effort to manually preserve brain function until further measures are taken to restore spontaneous blood circulation and breathing in a person experiencing cardiac arrest. Automated External Defibrillator (AED) is a portable electronic device that automatically diagnoses the heart rhythm and delivers a shock to restore proper heart function.

CPR and swift defibrillation are required to be performed as primary first aid treatment for a person during a sudden cardiac arrest. CPR requires the following steps: checking whether a patient is conscious or unconscious; asking someone to help or to call for emergency medical services; checking whether the patient is breathing normally; checking the carotid pulse; performing chest compressions if heart failure occurs; tilting the head back to clear the patient's airway; performing artificial respiration to provide air for the patient who is not breathing; and alternating chest compressions and artificial respiration until emergency crews arrive.

Rapid defibrillation means performing defibrillation on a patient using an AED possibly found in the surroundings or carried by an ambulance.

An AED is a device that delivers an electric shock to a patient in sudden cardiac arrest in order to resuscitate the heart of the patient. In more detail, the AED determines whether an electrocardiogram shows a normal wave or an abnormal wave, such as a ventricular fibrillation wave or a ventricular tachycardia wave, and then, if it is determined that the electrocardiogram shows an abnormal wave, sends an electronic shock to the heart so as to make the abnormal wave return to normalcy. These days, the AED is regarded to be as important as CPR. It is now imperative that public facilities be equipped with an AED, so it is easy to find the AED. In addition, the AED supports an audio guide function so that not only emergency crews, but ordinary people can handle the AED more easily.

The AED is used in conjunction with CPR, as described in the following: an electrode pad attaching step in which the AED is turned on and then electrode pads are attached, one to an area below the right clavicle and the other pad to an area below an armpit along the left torso at elbow level of a diaphragm; a heart rhythm analyzing step in which the heart rhythm is analyzed, and, if it is determined that defibrillation is necessary, the AED is automatically charged up to a preset level; a defibrillation step in which defibrillation is performed in response to a determination that defibrillation is necessary; and a repetitively performing step in which chest compression and artificial respiration are performed at a ratio of 30:2 after the analysis of the heart rhythm. Heart rhythm is analyzed at every two minutes, defibrillation is carried out, and the same operations are repeated sequentially.

The AED delivers an electric shock to the heart of a patient. In order to properly use the AED, medical experts are trained using an automated external defibrillator or a general defibrillator which is capable of delivering an electric shock. However, if an unskilled person administers the AED to deliver an electric shock, a dangerous accident may occur. For example, an excessive current may be discharged that threatens the patient's life. In addition, if an electric shock is generated repeatedly, every trainee cannot practice using a defibrillator due to limited battery life. For this reason, unskilled people are trained using an AED trainer, which is virtually the same as an AED, but does not deliver an electric shock.

Generally, a pair of one-time use electrode pads is provided for defibrillation training. An electrode pad is attached to the chest of a human body to analyze an electrocardiogram (ECG) signal, and deliver an electric shock to the body. A once-used electrode pad can hardly be attached again to the chest due to dust and foreign particles. In addition, the gel of an unsealed electrode may become drier with the passage of time, and thus adhesive force may be reduced. All of the above conditions may lead to an error in analyzing an ECG signal, thereby making it impossible to properly handle a patient. For example, an AED may deliver an electronic shock to a patient although it is not necessary. For those reasons, an electrode pad is recommended to be used only once. Yet, as defibrillation training aims for educating a plurality of trainees, an electrode pad is used repeatedly due to costs.

A pair of electrode pads of an AED needs to be attached to an area below the right clavicle and to an area below an armpit along the left torso at elbow level of a human body. Each electrode pad includes a drawing that shows the exact points on the body at which the electrode pads need to be attached. Nonetheless, an unskilled person may still attach an electrode pad on an incorrect area, or attach a left-side electrode pad to the right side of the body, and vice versa. In the above cases, an electrocardiogram wave may not be measured, or an electrocardiogram of a patient may be analyzed incorrectly due to a changed phase. For this reason, repeated defibrillation training is required to train a trainee in accurately attaching electrode pads on the correct areas of the body.

In the related art, a plurality of trainees cannot be sufficiently trained in using a defibrillator due to costs of changing electrode pads. In other words, a disposable electrode pad is used several times in spite of a possibility that an ECG signal may be analyzed incorrectly. In addition, a CPR simulator used for defibrillation training is simply a model of a real human body, and it is unable to recognize exact locations of electrode pads to thereby analyze an ECG signal and delivering an electric shock.

SUMMARY

The following description aims to provide a Cardiopulmonary Resuscitation (CPR) simulator enabling repeated defibrillation training, which employs semi-permanently usable magnetic electrode pads, and recognizes locations at which the electronic pads are attached, so that repeated defibrillation training may be possible using the CPR simulator.

In one general aspect, a Cardiopulmonary Resuscitation (CPR) simulator enabling repeated defibrillation training to allow a user to practice CPR and use of a defibrillator, is provided, and the CPR simulator includes a dummy in a body shape similar to a human body shape; a first magnet installed on a upper right part of a chest of a body of the dummy: a second magnet installed on a bottom left side of the chest of the body of the dummy; a first training pad having a first metal sheet, to be attached to the first magnet, formed on one side thereof and a first electrode pad, to be attached to the upper right part of the chest, formed on the other side thereof; and a second training pad having a second metal sheet, to be attached to the second magnet, formed on one side thereof and a second electrode pad, to be attached to the bottom left side of the chest, formed on the other side thereof, wherein the first and second metal sheets are attached to the first and second magnets, respectively, so that the first and second training pads are attached to the upper right part and the bottom left side, respectively, of the chest due to magnetic force.

A metal sheet may be formed in either the first training pad or the second training pad, and proximity sensors, each configured to detect the metal sheet, may be installed in an area close to the first magnet and an area close to the second magnet.

The metal sheet may be formed only in the first training pad, and the proximity sensors, each configured to detect the metal sheet, may be installed in an area close to the first magnet and to an area close to the second magnet.

A plurality of first magnets may be installed around a proximity sensor, whereas a plurality of second magnets may be installed around a different proximity sensor.

The first metal sheet and the second metal sheet may be in a form of thin foil, and each of the first metal sheet and the second metal sheet may be paper containing steel (Fe) or made from rubber or silicon materials containing steel (Fe) so as to be attached to a magnet.

Other features and aspects will be apparent from the following detailed description, the drawings, and the claims.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

Figure 1:
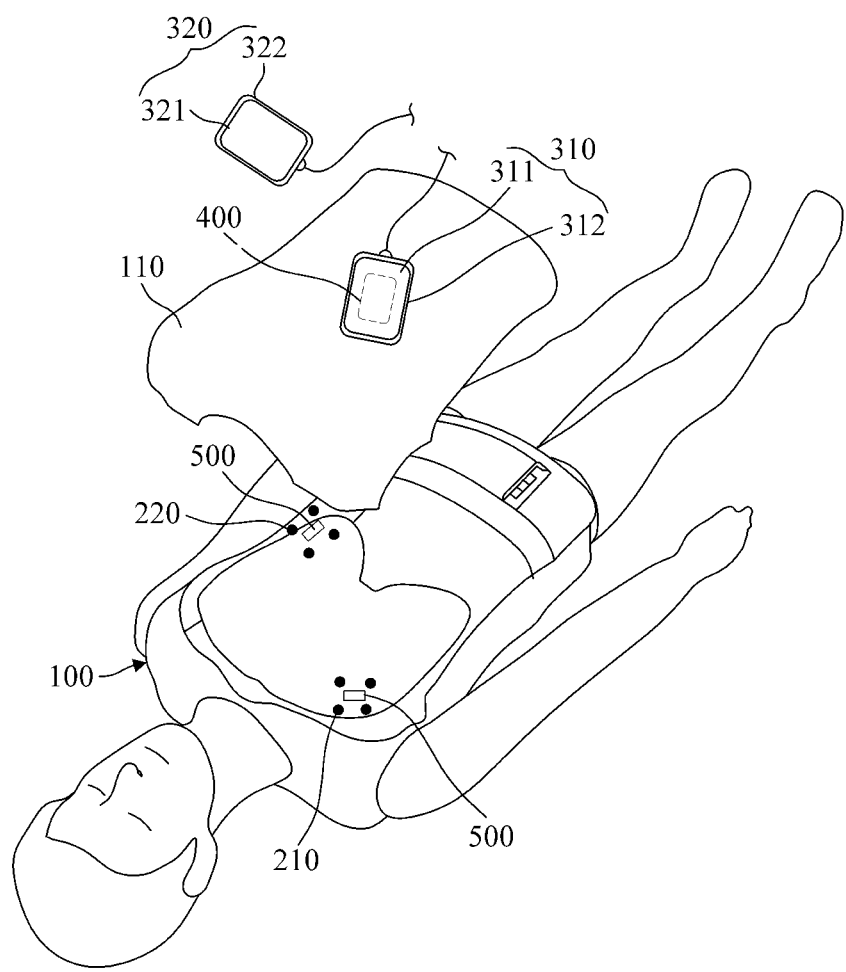
FIG. 1 is a perspective view illustrating a Cardiopulmonary Resuscitation (CPR) simulator enabling repeated defibrillation training according to an exemplary embodiment of the present invention.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following description is provided to assist the reader in gaining a comprehensive understanding of the methods, apparatuses, and/or systems described herein. Accordingly, various changes, modifications, and equivalents of the methods, apparatuses, and/or systems described herein will suggest themselves to those of ordinary skill in the art. Also, descriptions of well-known functions and constructions may be omitted for increased clarity and conciseness.

FIG. 1 is a perspective view illustrating a Cardiopulmonary Resuscitation (CPR) simulator enabling repeated defibrillation training according to an exemplary embodiment of the present invention. Referring to FIG. 1, the CPR simulator enabling repeated defibrillation training includes a dummy 100 having a body shape similar to a human body, a first magnet 210 to be installed to an upper right part of the chest of the body of the dummy 100, a second magnet 220 to be installed to the bottom left side of the chest of the body of the dummy 100, a first training pad 310 having a first metal sheet 311 formed on one side thereof and a first electrode pad 312 formed on the other side thereof, a second training pad 320 having a second metal sheet 321 formed on one side thereof and a second electrode pad 322 formed on the other side thereof. If the first and second metal sheets 311 and 321 are attached to the first and second magnets 210 and 220, respectively, the first and second training pads 310 and 320 are attached to the upper right part of the chest and the bottom left side of the chest in the dummy 100 by magnetic force.

The dummy 100 has a body shape similar to a human body. The dummy 100 may have a typical human body shape covered with silicon or urethane materials, which are of similar texture to real human skin in terms of elasticity. In addition, the dummy 100 may consist of a body, a head, arms and legs. A joint part used in each body part may be designed to have the same degree of freedom kinematics of a corresponding joint of a human body.

Each of the first and second magnets 210 and 220 has a magnetic force that attaches the first and second metal sheets 311 and 321 to the first and second magnet 210 and 220, respectively. The first magnet 210 is installed to the upper right part of the body of the dummy 100. Specifically, the first magnet 210 is installed below the right clavicle of the dummy 100. In addition, the second magnet 220 is installed to the bottom left side of the body of the dummy 100. Specifically, the second magnet 220 is installed to an area below an armpit along the left torso at elbow level of the dummy 100.

The first training pad 310 has the first metal sheet 311 formed on one side thereof and the first electrode pad 312 formed on the other side thereof, and may be configured to be a combination of the thin-foil first metal sheet 311 and the first electrode pad 312 which are laminated adhesively. Similarly, the second training pad 320 has the second metal sheet 321 formed on one side thereof and the second electrode pad 322 formed on the other side thereof, and may be configured to be a combination of the thin-foil second metal sheet 321 and the second electrode pad 322 which are laminated adhesively.

Accordingly, if the first metal sheet 311 is attached to the first magnet 210 by magnetic force, the first electrode pad 312 laminated on the first metal sheet 311 may become attached to the upper right part of the body of the dummy 100. In addition, if the second metal sheet 321 is attached to the second magnet 220 by magnetic force, the second electrode pad 322 laminated on the second metal sheet 321 may become attached to the bottom left side of the body of the dummy 100.

The first and second electrode pads 312 and 322 may be provided as a pair of electrode pads in an AED trainer, an AED, and a defibrillation equipment used for defibrillation training. According to an exemplary embodiment of the present invention, the first and second metal sheets 311 and 321 may be made from various types of materials containing steel (Fe). In particular, the first and second metal sheets 311 and 321 may be paper containing steel (Fe) or may be made from rubber or silicon which is mixed with steel (Fe).

Accordingly, if the first and second metal sheets 311 and 321 are attached to the first and second magnets 210 and 220, the first and second training pads 310 and 320 are attached to the upper right part of the chest and the bottom left side of the chest, respectively, by magnetic force.

Figure 2:
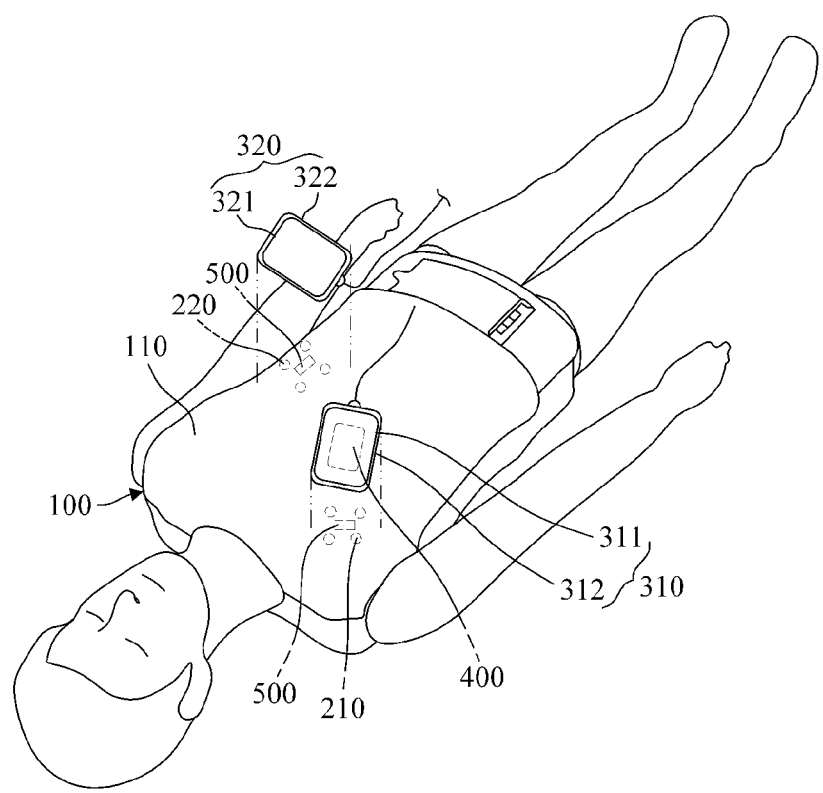
FIG. 2 is a perspective view illustrating a dummy shown in FIG. 1, to which a cover is coupled.
Figure 3:
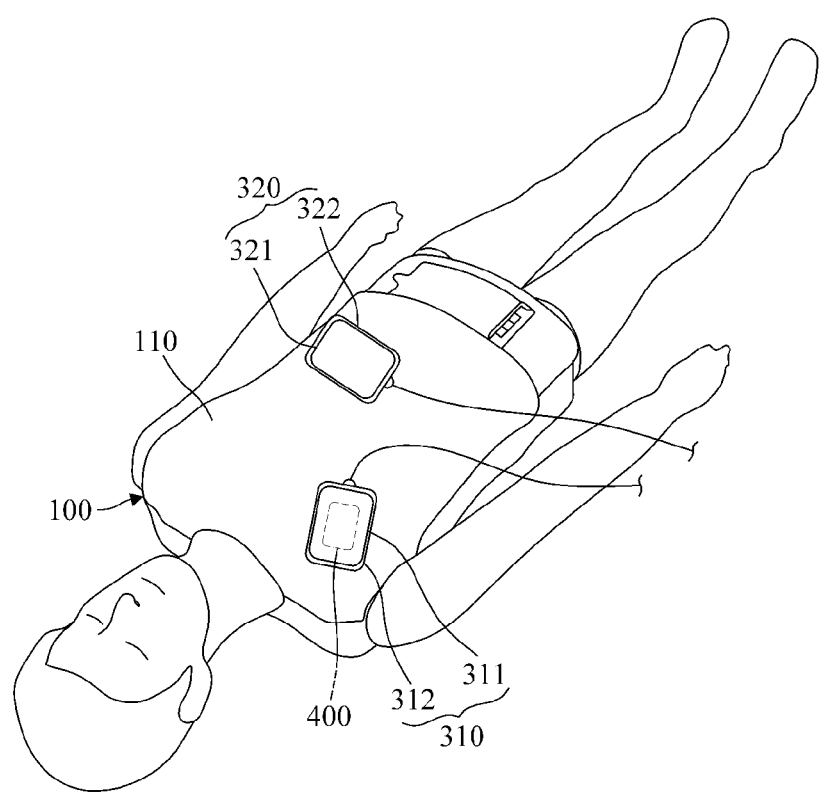
FIG. 3 is a perspective view illustrating a dummy shown in FIG. 2, to which first and second training pads are attached.
Figure 4:
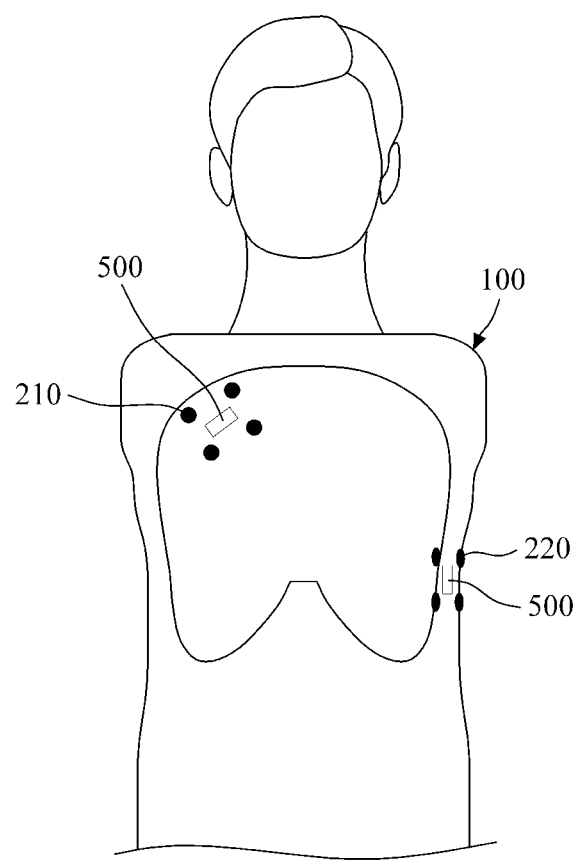
FIG. 4 is a front view illustrating a CPR simulator enabling repeated defibrillation training according to an exemplary embodiment of the present invention.
Figure 5:
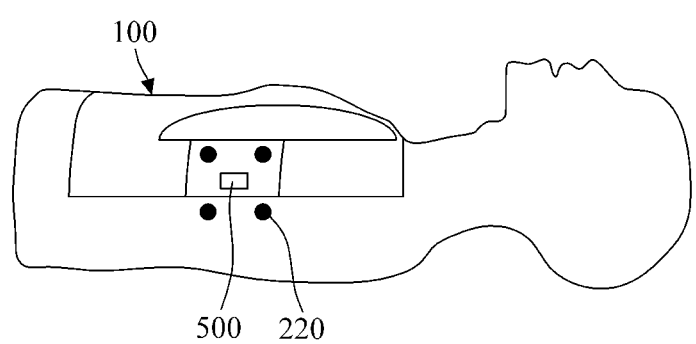
FIG. 5 is a side view illustrating a CPR simulator enabling repeated defibrillation training according to an exemplary embodiment of the present invention.

FIG. 3 is a perspective view illustrating a dummy to which first and second training pads, shown in FIG. 2, are attached. FIG. 4 is a front view illustrating a CPR simulator enabling repeated defibrillation training according to an exemplary embodiment of the present invention. FIG. 5 is a side view illustrating a CPR simulator enabling repeated defibrillation training according to an exemplary embodiment of the present invention.

Referring to FIGS. 3 to 5, an aluminum sheet 400 is formed on either the first training pad 310 or the second training pad 320, and a proximity sensor 500 is installed on an area close to the first magnet 210 or the second magnet 220 in the dummy 100. Inserted between the first metal sheet 311 and the first electrode pad 312 or between the second metal sheet 321 and the second electrode pad 322, the aluminum sheet 400 may be provided in the first training pad 310 or the second training pad 320. At this time, the laminated structure between the first metal sheet 311, the metal sheet 321 and the first electrode pad 312 or between the second metal sheet 312, the metal sheet 321 and the second electrode pad 322 may remain fixed using adhesive. That is, in order to recognize exact locations at which the first and second training pads 320 and 320 are attached, the proximity sensors 500 are installed at locations where the first and second training pads 310 and 320 are attached, whereas the aluminum sheet 400 that the proximity sensor 500 may detect is attached to either the first training pad 310 or the second training pad 320. In this way, it is possible to check not only whether each of the first and second training pads 310 and 320 are attached at correct locations, but also whether the first and second training pads 310 and 320 are attached to the upper right part of the chest and the bottom left side of the chest, respectively, in the dummy 100. Detailed descriptions about the aluminum sheet 400 and the proximity sensor 500 will be provided later. As described above, more precise defibrillation training may be possible due to the aluminum sheet 400 and the proximity sensors 500.

Figure 6:
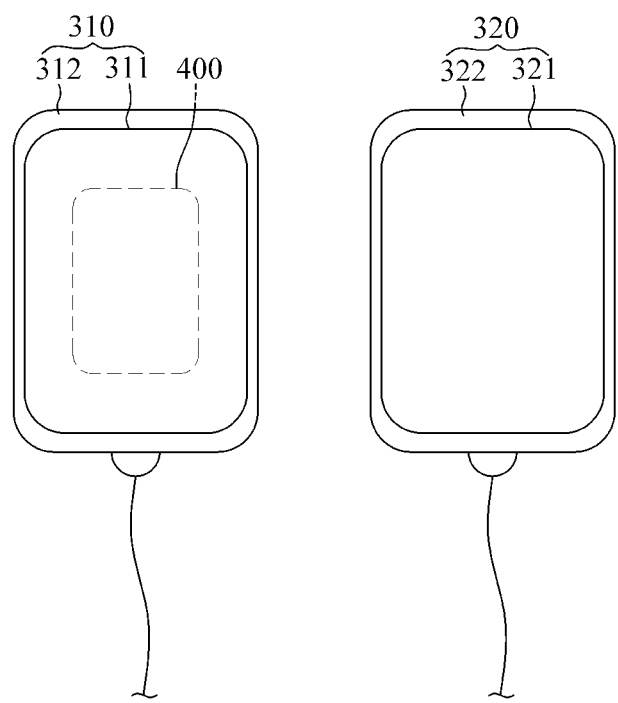
FIG. 6 is a front view illustrating the first and second training pads shown in FIG. 1.
Figure 7:
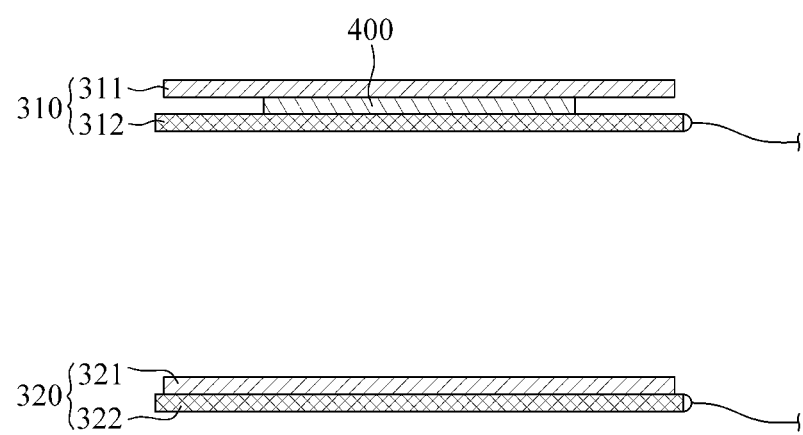
FIG. 7 is a cross sectional view illustrating the first and second training pads shown in FIG. 1.

FIG. 6 is a front view illustrating first and second training pads shown in FIG. 1, and FIG. 7 is a side view illustrating first and second training pads shown in FIG. 1.

According to an exemplary embodiment of the present invention, a plurality of first magnets 210 are installed in an area close to a proximity sensor 500, and a plurality of second magnets 220 are installed in an area close to a different proximity sensor 500. Each of the first magnets 210 and the second magnets 220 has magnetic force, so that the first metal sheet 311 of the first training pad 310 and the second metal sheet 321 of the second training pad 320 may be attached to the first magnets 210 and the second magnets 220, respectively, by magnetic force. If there are a plurality of first magnets 210 and a plurality of second magnets 220, the first magnets 210 and the second magnets 220 are installed over a wider surface area, and thus collective magnetic force of the first magnets 210 or the second magnets 220 becomes greater, so that the first and the second training pads 310 and 320 may be prevented from being detached from the dummy 100 even in the case where a chest press is performed. In addition, as each proximity sensor 500 is arranged at the center of the first magnets 210 and at the center of the second magnets 220, the aluminum sheet 400 may be detected more accurately when the first and second training pads 310 and 320 are attached to the dummy.

FIG. 2 is a perspective view of a dummy shown in FIG. 1, to which a cover is coupled. Referring to FIG. 2, the dummy 100 includes a cover 110 to cover the body in which the first and second magnets 210 and 220 or the proximity sensors 500 are installed. That is, the cover 110 is used to open or close the body of the dummy 100, and the first and second magnets 210 and 220 and the proximity sensors 500 may be protected by the cover 110.

The cover 110 is able to be coupled to and detached from the body of the dummy 100. In addition, the cover 110 may be made from various materials as long as such materials does not interfere with the magnetic force of the first and second magnets 210 and 220, and not hinder detecting performance of the proximity sensors 500 for the purpose of attachment of the first and second metal sheets 311 and 321 to the dummy 100.

According to an exemplary embodiment of the present invention, the aluminum sheet 400 is formed only in the first training pad 310, not in the second training pad 320, and each proximity sensor 500, which detects the aluminum sheet 400, is installed in an area close to the first magnet 210 and an area close to the second magnet 220.

The proximity sensor 500 may be an inductance detector or high-frequency detector, which outputs an ON/OFF signal when recognizing an object. Alternatively, the proximity sensor 500 may include a signal outputting means, such as a Liquid Emitting Display (LED) lamp and a display panel, which outputs a result of detecting the aluminum sheet 400. The aluminum sheet 400 may be a metal sheet made from steel (Fe), copper (Cu), Aluminum (Al), Nickel (Ni), Gold (Au) and Silver (Ag), all of which is able to be detected by the proximity sensor 500.

The aluminum sheet 400 is formed between the first metal sheet 311 and the first electrode pad 312 in the first training pad 310, and thus, when the first training pad 310 is attached to the dummy 100, the proximity sensor 500 may be able to check attachment of the first training pad 310 and outputs an ON signal to notify that the first training pad 310 is properly attached. Meanwhile, as the aluminum sheet 400 is not provided between the second metal sheet 321 and the second electrode pad 322 in the second training pad 320, the proximity sensor 500 is unable to detect attachment of the second training pad 320 and thus outputs an OFF signal continuously. Therefore, according to an ON signal output from the right proximity sensor 500 and an OFF signal output from the left proximity sensor 500, it is possible to check whether the first training pad 310 and the second training pad 320 are respectively attached at correct locations in the dummy 100.

In the event that the aluminum sheet 400 is formed only on the first training pad 310, which is to be attached to the right side of the dummy 100 as described above, if the first and second training pads 310 and 320 are properly attached to the dummy 100, an proximity sensor 500 close to the first magnet 210 outputs an ON signal while an proximity sensor 500 close to the second magnet 220 outputs an OFF signal. Yet, if each of the first and second training pads 310 and 320 is attached at a location corresponding to the other, the proximity sensor 500 close to the first magnet 210 outputs an OFF signal while the proximity sensor 500 close to the second magnet 220 outputs an ON signal, showing that each of the first and second training pads 310 and 320 are attached at a location corresponding to the other. In addition, if both the proximity sensor 500 close to the first magnet 210 and the proximity sensor 500 close to the second magnet 220 output an OFF signal, it is possible to confirm that the first and second training pads 310 and 320 are attached at incorrect locations of the dummy 100. Furthermore, if both the proximity sensor 500 close to the first magnet 210 and the proximity sensor 500 close to the second magnet 220 output an ON signal, it is possible to confirm that substances other than the first and second training pads 310 and 320 are attached to the dummy 100. If necessary, the aluminum sheet 400 may be formed only in the second training pad 320, not in the first training pad 310.

According to the above-described exemplary embodiments of the present invention, a Cardiopulmonary Resuscitation (CPR) simulator enabling repeated defibrillation training allows electrode pads to be used repeatedly in defibrillation training. As a result, more trainees can practice the use of a defibrillator, and a person or institution in charge of the defibrillation training may be relieved of the cost burden as equipment costs may be reduced.

In addition, the trainees can be trained to attach electrode pads at correct locations of a body, so that all the trainees may be good at using a defibrillator, and become well-prepared for an emergency situation through repeated and effective defibrillation training.

Furthermore, magnetic training pads and a CPR simulator are used for both an AED trainer and an AED trainee. Thus, a diverse range of people from medical experts to unskilled people can be trained effectively.

A number of examples have been described above. Nevertheless, it should be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A Cardiopulmonary Resuscitation (CPR) simulator enabling repeated defibrillation training to allow a user to practice CPR and use of a defibrillator, the CPR simulator comprising:
   a dummy in a body shape similar to a human body shape;
   a first magnet installed on an upper right part of a chest of a body of the dummy;
   a second magnet installed on a bottom left side of the chest of the body of the dummy;
   a first training pad having a first metal sheet, to be attached to the first magnet, formed on one side thereof and a first electrode pad, to be attached to the upper right part of the chest, formed on the other side thereof;
   a second training pad having a second metal sheet, to be attached to the second magnet, formed on one side thereof and a second electrode pad, to be attached to the bottom left side of the chest, formed on the other side thereof;
   an additional metal sheet formed in one of the first training pad or the second training pad; and
   proximity sensors installed in at least one of an area close to the first magnet or an area close to the second magnet in the chest of the body of the dummy,
   wherein the proximity sensors are each configured to detect the additional metal sheet, and
   wherein the first training pad and the second training pad are each configured to be attached to the dummy by coupling the first metal sheet to the first magnet and the second metal sheet to the second magnet with magnetic force.

2. The CPR simulator of claim 1, wherein the additional metal sheet is formed only in the first training pad, and the proximity sensors, each configured to detect the additional metal sheet, are installed in an area close to the first magnet and to an area close to the second magnet.

3. The CPR simulator of claim 1, wherein a plurality of first magnets are installed around a proximity sensor, whereas a plurality of second magnets are installed around a different proximity sensor.

4. The CPR simulator of claim 1, wherein the first metal sheet and the second metal sheet are in a form of thin foil, and each of the first metal sheet and the second metal sheet is paper containing steel (Fe) or made from rubber or silicon materials containing steel (Fe) so as to be attached to a magnet.

5. The CPR simulator of claim 1, wherein the additional metal sheet comprises iron (Fe), copper (Cu), aluminum (Al), nickel (Ni), gold (Au), or silver (Ag).

* * * * *